(12) United States Patent
Hall

(10) Patent No.: US 6,581,363 B1
(45) Date of Patent: Jun. 24, 2003

(54) MOWER DECK CLEANER

(75) Inventor: Kenneth E. Hall, Kokomo, IN (US)

(73) Assignee: Martin Hall, Inc., Kokomo, IN (US)

( * ) Notice: Subject to any disclaimer, the term of this patent is extended or adjusted under 35 U.S.C. 154(b) by 0 days.

(21) Appl. No.: 09/998,071

(22) Filed: Nov. 30, 2001

(51) Int. Cl.[7] ............................................... A01D 67/00
(52) U.S. Cl. ........................................ 56/12.1; 56/320.1
(58) Field of Search ............................ 56/1, 12.1, 16.7, 56/16.8, 320.1; 134/198; 239/276, 282

(56) References Cited

U.S. PATENT DOCUMENTS

| | | |
|---|---|---|
| 1,182,898 A | 5/1916 | Eilertsen |
| 2,504,416 A | 4/1950 | Hileman |
| 2,835,305 A | 5/1958 | Boyer |
| 2,936,563 A | 5/1960 | Blume |
| 2,984,061 A | 5/1961 | Stabnau |
| 2,992,524 A | 7/1961 | Stabnau |
| 3,040,990 A | 6/1962 | Gotti |
| 3,112,596 A | 12/1963 | Price |
| 3,214,893 A | 11/1965 | Griffin |
| 3,490,212 A | 1/1970 | Hengesbach |
| 3,535,862 A | 10/1970 | Wittwer |
| 3,667,785 A | 6/1972 | Kapeker |
| 4,362,187 A | 12/1982 | Harris et al. |
| 4,437,611 A | 3/1984 | Gilroy |
| D275,314 S | 8/1984 | Cornell |
| 4,613,169 A | 9/1986 | Engelhart |
| 4,676,533 A | 6/1987 | Gerondale |
| 5,027,590 A | 7/1991 | Stark |
| 5,189,869 A * | 3/1993 | McBride et al. ............ 56/320.1 |
| 5,444,967 A * | 8/1995 | Meuth ......................... 56/12.1 |
| 5,499,492 A | 3/1996 | Jameson |
| 6,260,340 B1 * | 7/2001 | Sanner ........................ 56/16.8 |

FOREIGN PATENT DOCUMENTS

| | | |
|---|---|---|
| GB | 625488 | 6/1949 |
| GB | 2023249 | 6/1978 |

* cited by examiner

Primary Examiner—Thomas B. Will
Assistant Examiner—Nathan Mammen
(74) Attorney, Agent, or Firm—Woodard, Emhardt, Moriarty, McNett & Henry LLP

(57) ABSTRACT

A mower deck cleaning device for a rotary mower for removing clippings from the inside of the mower blade housing. A tubular conduit is mounted on the mower so as to extend through the deck of the mower. A garden hose may be attached to the conduit to flow water through the conduit. A rotor mounted on the conduit receives the water from the hose and projects a rotating pattern of pressurized fluid for cleaning the inside of the housing.

11 Claims, 3 Drawing Sheets

MOWER DECK CLEANER

FIELD OF THE INVENTION

The present invention relates to a mower deck cleaning device for the type of mower having a rotating blade and to an improved method for cleaning a lawn mower.

DESCRIPTION OF THE PRIOR ART

One of the problems involved in the operation and maintenance of rotary type lawn mowers is the buildup of grass clippings under the deck and within the housing of the mower. The clippings may be removed by hand or with a broom or by scraping. Such a procedure has drawbacks in that lifting and tilting the mower can cause gas and oil to drain out of the engine of the mower. Also, in the situation of a large mower, the weight of the mower may be so great that it cannot be lifted conveniently.

Various devices have been proposed in the prior art to deal with the cleaning of clippings from the mower. One of these solutions involves providing a system for directing a stream of water against the inside wall of the housing and/or onto the rotating blade. Examples of this solution are the U.S. Pat. Nos. to Meuth 5,444,967, Wittwer 3,535,862 and Griffin 3,214,893. The blade then functions to fling the water against the inside surfaces of the housing to remove the grass clippings from those surfaces. The present invention is intended to improve the effectiveness and convenience of a water stream or other fluid stream in cleaning the mower.

SUMMARY OF THE INVENTION

One embodiment of the present invention involves a cleaning device for mounting on a lawnmower which lawnmower has a housing about a cutting blade. The cleaning device includes a tubular conduit mounted on the lawnmower and extending through the housing for conducting a cleaning fluid under pressure into the housing. A rotor is rotatably mounted on the conduit for rotation inside of the housing about an axis. The rotor has a series of fluid channels communicating with the conduit which are arranged to discharge fluid in the same rotary direction about the axis whereby pressurized fluid from the conduit entering into the channels of the rotor causes the rotor to rotate and spray pressurized fluid in rotating streams against the inside surfaces of the housing.

Another embodiment of the invention might include a cleaning device for mounting on the lawnmower having a housing about a rotary cutting blade. The lawnmower has a horizontal deck forming a part of the housing and located above the rotary cutting blade. The cleaning device includes an elbow having a elbow fluid passage therethrough. The elbow is fixedly mounted to and above the deck of the lawnmower. A cylindrical member having a first fluid passage therein is fixedly mounted to and below the deck with the first fluid passage in communication with the elbow fluid passage. There is also provided a cylindrical rotor rotatably mounted within the cylindrical member for rotation about a vertical axis. The cylindrical member has a group of second fluid passages extending from the first fluid passage to an area just above and adjacent to the rotor. The cylindrical rotor has a series of fluid channels communicating with the second fluid passages. The fluid channels have exit portions which are directed horizontally and in the same rotary direction about the axis whereby pressurized fluid exiting from the exit portions causes the rotor to rotate and spray pressurized fluid horizontally in rotating streams against the inside surfaces of the housing.

Still another embodiment of the invention is a method of cleaning a lawn mower. A spray nozzle is mounted on the mower for repeated motion through a path. The method also includes forcing pressurized fluid through the spray nozzle to repeatedly strike deposited grass clippings on the mower to wash them from the mower.

DETAILED DESCRIPTION OF THE PREFERRED EMBODIMENT

Figure 1:
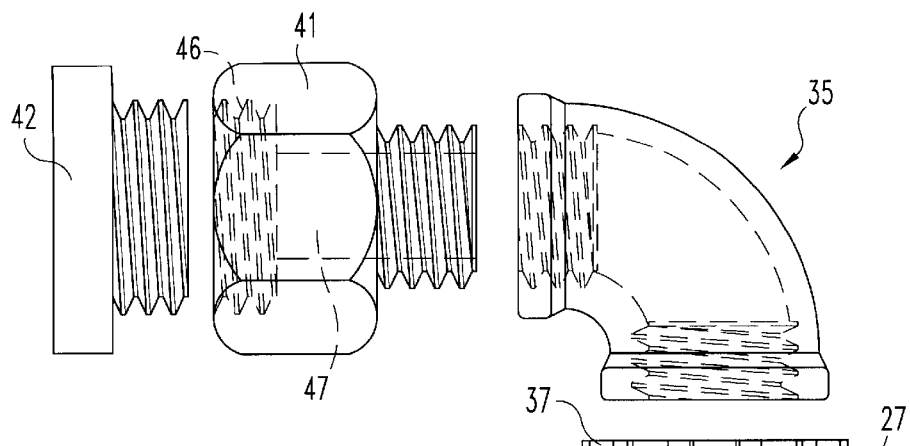
FIG. 1 is an exploded view of the cleaning device of the present invention.
Figure 2:
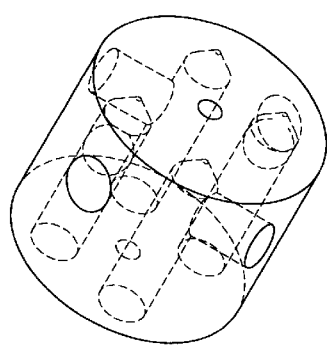
FIG. 2 is a perspective view of a rotor forming a part of the structure of FIG. 1.

For the purposes of promoting an understanding of the principles of the invention, reference will now be made to the embodiment illustrated in the drawings and specific language will be used to describe the same. It will nevertheless be understood that no limitation of the scope of the invention is thereby intended, and alterations and modifications in the illustrated device, and further applications of the principles of the invention as illustrated therein are herein contemplated as would normally occur to one skilled in the art to which the invention relates.

Figure 4:
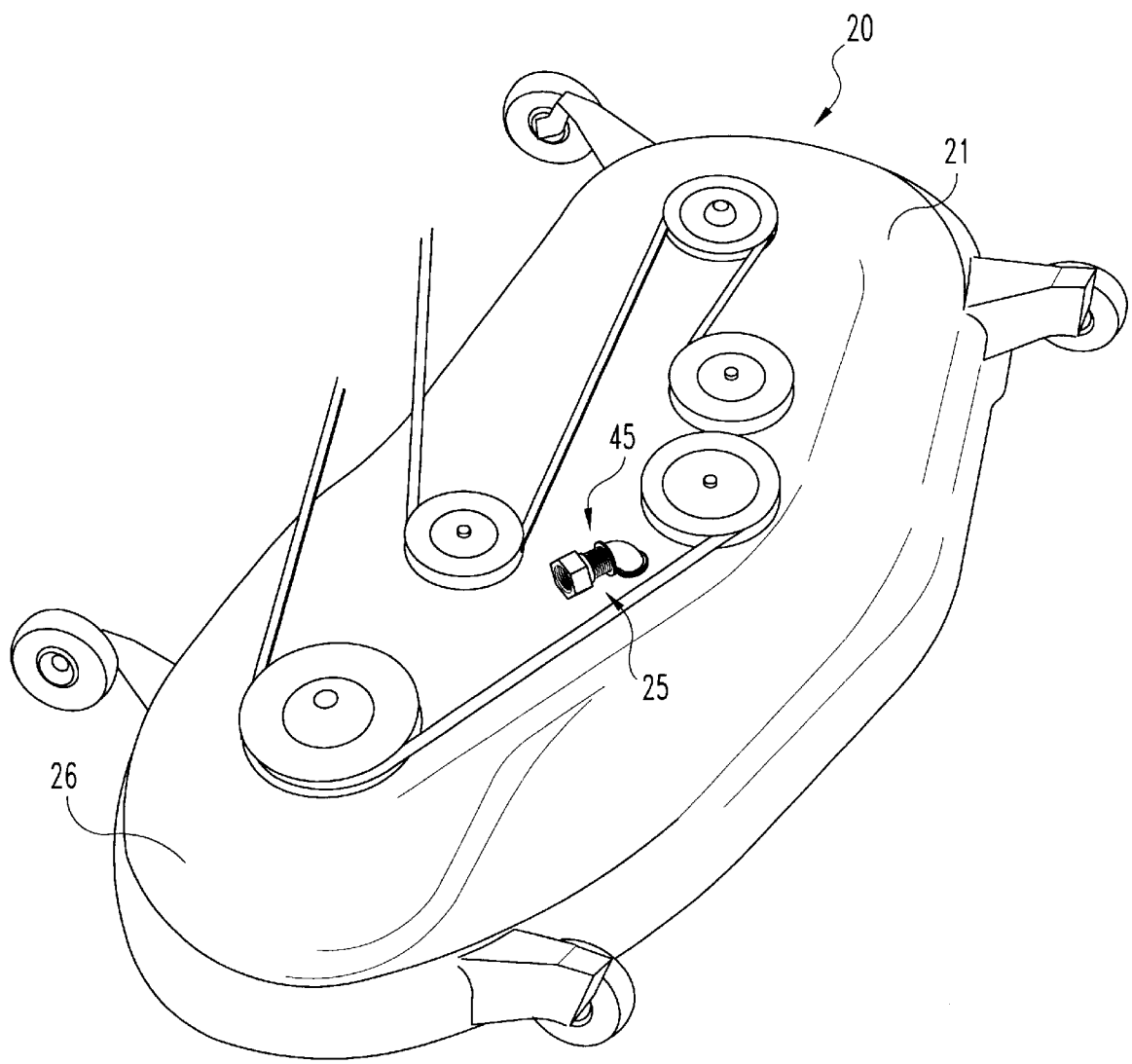
FIG. 4 is a top plan view of a rotary mower housing showing the cleaning device of the present invention mounted thereon.
Figure 5:
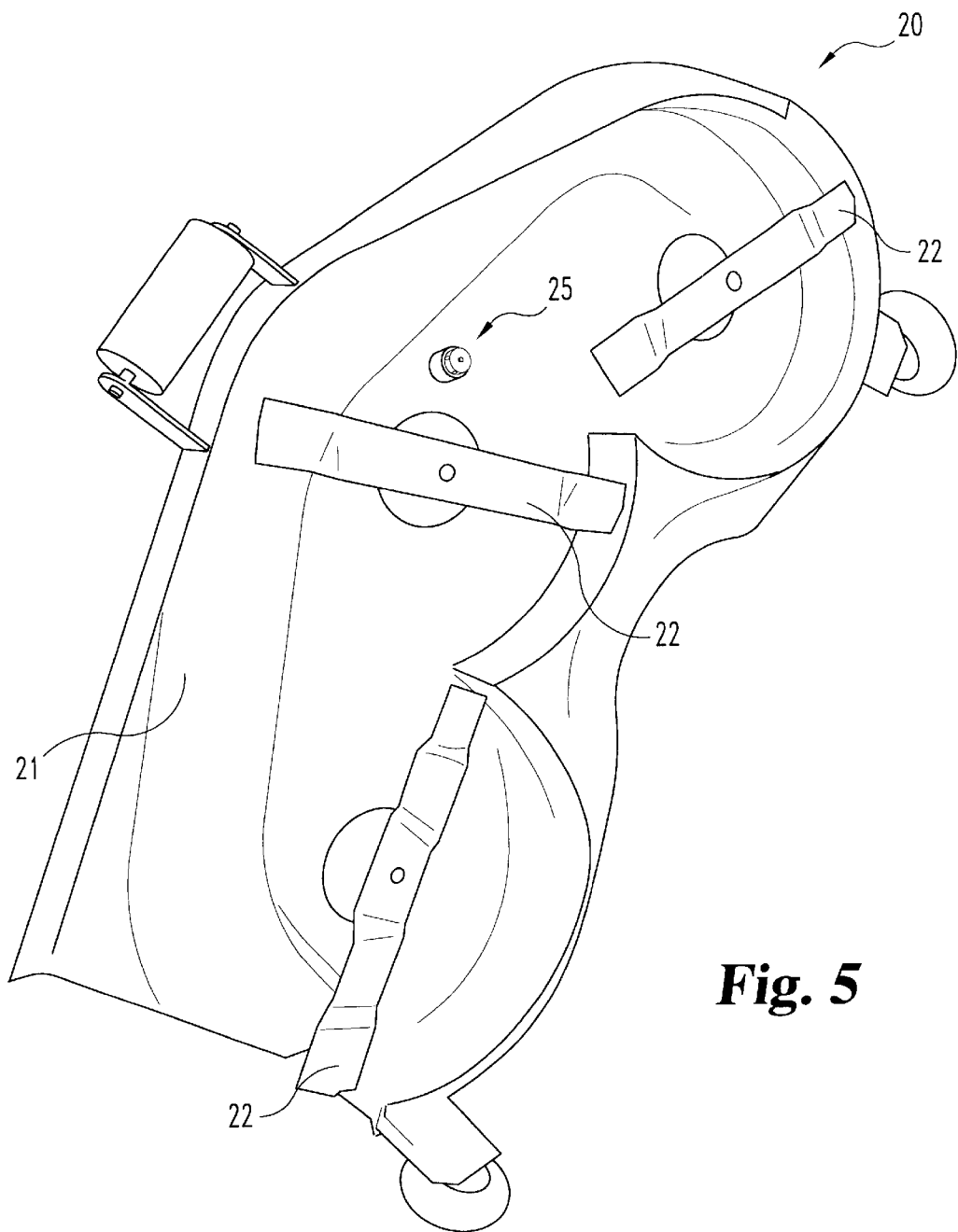
FIG. 5 is a bottom plan view of the mower housing of FIG. 4.

Referring to FIGS. 4 and 5, there is illustrated a rotary lawnmower 20 having a housing 21. FIG. 5 shows the bottom of the housing 21 and shows that there are three rotary blades 22 mounted on the housing for rotation and cutting the grass. The cleaning device 25 of the present invention is mounted so as to extend through the horizontal deck 26 of the housing 21. The cleaning device is useful not only with rotary lawnmowers having three blades as shown but is also useful with rotary lawnmowers having other numbers of blades such as only one. In the illustrated embodiment the cleaning device 25 is mounted in such a way that it does not extend sufficiently downwardly so as to interfere with the rotation of the center most blade 22.

Referring now to FIGS. 1, 2, 3 and 6 the details of the cleaning device are illustrated. In FIG. 1 the deck 26 is illustrated as having a suitable sized bore 27 drilled through the deck so as to receive a nipple 30. The nipple 30 has a fluid passageway 31 therethrough and is adapted to be mounted so as to extend through the deck 26 and be threadedly attached to an elbow 35 and a cylindrical member 36. Also shown in FIG. 1 are lock nuts 37 and 40 which function to mount the nipple 30 in place through the deck 26. Also shown in FIG. 1 is reducer member 41 and plug 42.

Figure 6:
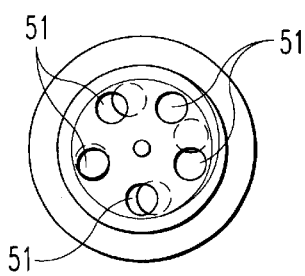
FIG. 6 is a view of a portion of the cleaning device of FIG. 1 taken along the line 6—6 of FIG. 1 in the direction of the arrows.

The various parts 41, 35, 30 and 36 function as a tubular conduit for conducting water or other fluid placed under pressure into the reducer member 41 by threadedly attaching the source of pressurized water or other fluid to the internally threaded entrance 46 of the internal passage 47 through the reducer member 41. The source of pressurized fluid may be a garden hose. The plug 42 functions to shut off the reducer member fluid passage 47 when the present device is not being used to clean out the clippings from the inside of the housing of the lawnmower. As can be seen from FIG. 1 the cylindrical member 36 is internally threaded at 50 for mounting on the nipple 30. As shown in FIGS. 1 and 6 there are five equally spaced discharge conduits 51 formed in the cylindrical member 36. The discharge conduits extend from the hollow interior 53 of the cylindrical member 36 to the cylindrical recess 54 in the lower portion of the cylindrical member 36.

An externally cylindrical rotor 52 is rotatably mounted upon the cylindrical member 36 by means of a pin 55 and is received within cylindrical-recess 54. The rotor 52 has a series of fluid channels 56. Each of the fluid channels has a vertical portion 57 and a horizontal exit portion 60. Stated in another way each of the channels 56 includes a pair of connected closed bores with one 57 of the bores extending axially of the rotor and the other 60 of the bores extending from the respective one bore to the outside of the rotor. When water under pressure is conducted through the cleaning device by attaching a hose to the device at the threads 46 the rotor 52 is caused to rotate by reason of the fact that each of the discharge conduits' horizontal portion 60 extends and opens in the same rotary direction about the axis of the pin 55. As a result the water exiting from the fluid channels 56 is caused to project against the inside surface of the housing at high pressure and also is caused to rotate or move with the rotor as it rotates causing the pressurized fluid from the rotor to hit the inside of the housing at a continuously changing angle thereby effectively cleaning the inside of the housing.

The cleaning device 25 can be used with the engine of the mower turned off. Because the rotor 52 projects streams of water in a continuously rotating pattern, the inside of the housing 21 is effectively cleaned. There are, however, certain portions of the housing that may not be directly reached by the rotating streams from the rotor. In order to reach all portions of the housing with washing fluid, the engine of the mower can be operated to rotate the blades 22. A certain amount of the pressurized water streams will deflect off of the inside surfaces of the housing in effect bouncing back into the path of the rotating blades 22. The water then moves by centrifugal force back against all of the inside surfaces of the housing thus cleaning the portions not reached when the blades are not rotating.

Figure 3:
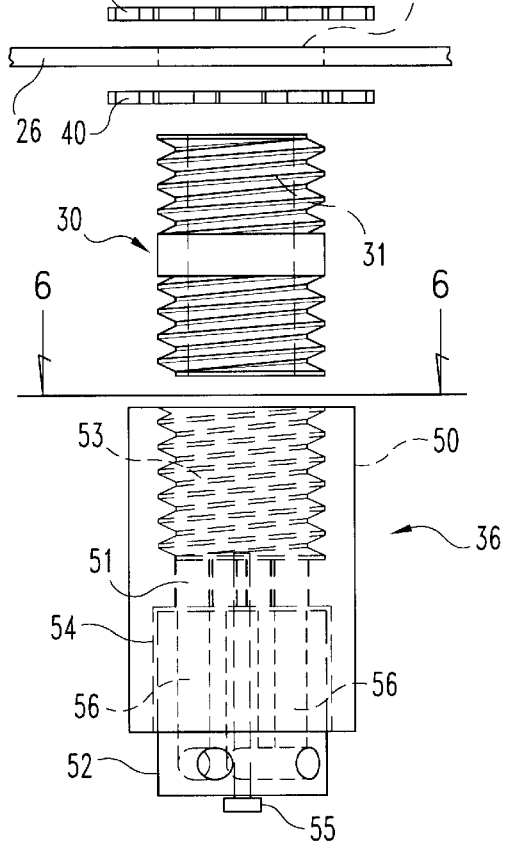
FIG. 3 is a top plan view of the rotor of FIG. 2
Figure 3:
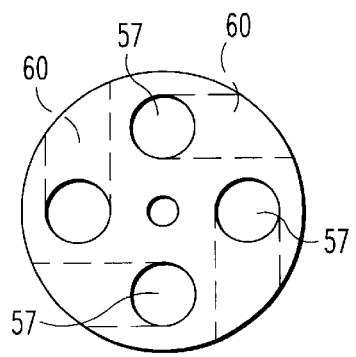

It can be seen from FIGS. 3 and 6 that there are five discharge conduits 51 in the cylindrical member 36 but only four fluid channels 56 in the rotor 52. Also the conduits 51 and channels 56 are sufficiently great in cross sectional area so that there is always communication between at least one conduit 51 and one channel 56. By constructing the device in this fashion, there is always an open path for pressurized fluid through the cleaning device which insures that a rotating force will be exerted on the rotor 52 when fluid is flowing out of the channel portions 60.

While the invention has been illustrated and described in detail in the drawings and foregoing description, the same is to be considered as illustrative and not restrictive in character, it being understood that only preferred embodiments have been shown and described and that all changes and modifications that come within the spirit of the invention are desired to be protected.

As an example of such a modification, an apparatus similar to a lawn sprinkler could be mounted on the lawn mower for cleaning the grass clippings from the mower. Such a lawn sprinkler type device would include a rotating spray nozzle that operates similarly to the above-described device to move a strong rapidly moving spray against the deposited grass cuttings. The pressure of the water causes the rotating spray nozzle to project a strong stream of water against the deposited grass clippings on the mower washing them from the mower. The movement of the water also causes the spray nozzle to rotate so that the stream of water moves through a rotating path.

What is claimed is:

1. A cleaning device for mounting on a lawnmower having a housing about a cutting blade, said cleaning device comprising:

a tubular conduit mounted on said lawnmower and extending through the housing for conducting a cleaning fluid under pressure into the housing;

a rotor rotatably mounted on said conduit for rotation inside of said housing about an axis; and said rotor having a series of fluid channels communicating with said conduit and which are arranged to discharge fluid in the same rotary direction about said axis whereby pressurized fluid from said conduit entering into the channels of said rotor causes said rotor to rotate and spray pressurized fluid in rotary streams against the inside surfaces of said housing, each of said channels including a pair of connected closed bores with one of said bores of the pair extending axially of said rotor and the other of said bores extending from the respective one bore to the outside of said rotor.

2. The cleaning device of claim 1 wherein said tubular conduit comprises an elbow having an elbow fluid passage therethrough;

a reducer member threadedly secured to said elbow and having a fluid passage therethrough communicating with said elbow fluid passage; and a plug having threads for threaded attachment to sad reducer member for closing off said elbow fluid passage.

3. The cleaning device of claim 2 additionally comprising a nipple which is externally threaded and has a fluid passage therethrough;

said tubular conduit further comprising a cylindrical member which has said rotor rotatably mounted thereon; and said nipple extending through said housing and threadedly fixing said elbow to said housing and also threadedly fixing said cylindrical member to said housing within said housing.

4. The cleaning device of claim 1 wherein said tubular conduit has five equally spaced discharge conduits which are adjacent said series of fluid channels of said rotor, the fluid channels of said rotor being four in number, said discharge conduits being sufficiently large so that there is always communication between at least one discharge conduit and one fluid channel.

5. A cleaning device for mounting on a lawnmower having a housing about a rotary cutting blade, said mower having a horizontal deck forming a part of said housing and located above said rotary cutting blade, said cleaning device comprising:

an elbow having an elbow fluid passage therethrough, said elbow being fixedly mounted to and above said deck;

a cylindrical member having a first fluid passage therein, said cylindrical member fixedly mounted to and below said deck with said first fluid passage in communication with said elbow fluid passage; and a cylindrical rotor rotatably mounted within said cylindrical member for rotation about a vertical axis, said cylindrical member having a group of second fluid passages extending from said first fluid passage to an area just above and adjacent to said rotor, said cylindrical rotor having a series of fluid channels communicating with said second fluid passage, said fluid channels having exit portions which are directed horizontally and in the same rotary direction about said axis whereby pressurized fluid exiting.from said exit portions causes said rotor to rotate and spray pressurized fluid horizontally in rotating streams against the inside surfaces of said housing, each of said channels including a pair of connected closed bores with one of said bores of the pair extending axially of said rotor and the other of said bores extending from the respective one bore to the outside of said rotor.

6. The cleaning device of claim 5 additionally comprising a reducer member threadedly secured to said elbow and having a fluid passage therethrough communicating with said elbow fluid passage; and a plug having threads for threaded attachment to said reducer member for closing off said elbow fluid passage.

7. The cleaning device of claim 6 additionally comprising a nipple which is externally threaded and has a fluid passage therethrough said nipple extending through said deck and threadedly fixing said elbow to said deck and also threadedly fixing said cylindrical member to said deck.

8. The cleaning device of claim 5 wherein said cylindrical member has five equally spaced discharge conduits which are adjacent said series of fluid channels of said rotor, the fluid channels of said rotor being four in number, said discharge conduits being sufficiently large so that there is always communication between at least one discharge conduit and one fluid channel.

9. The cleaning device of claim 8 additionally comprising a reducer member threadedly secured to said elbow and having a fluid passage therethrough communicating with said elbow fluid passage, and a plug having threads for threaded attachment to said reducer member for closing off said elbow fluid passage.

10. The cleaning device of claim 9 additionally comprising a nipple which is externally threaded and has a fluid passage therethrough, said nipple extending through said deck and threadedly fixing said elbow to said deck and also threadedly fixing said cylindrical member to said deck.

11. The cleaning device of claim 10 wherein said cylindrical member has five equally spaced discharge conduits which are adjacent said series of fluid channels of said rotor, the fluid channels of said rotor being four in number, said discharge conduits being sufficiently large so that there is always communication between at least one discharge conduit and one fluid channel of said series of fluid channels.

* * * * *